Patented Apr. 15, 1941

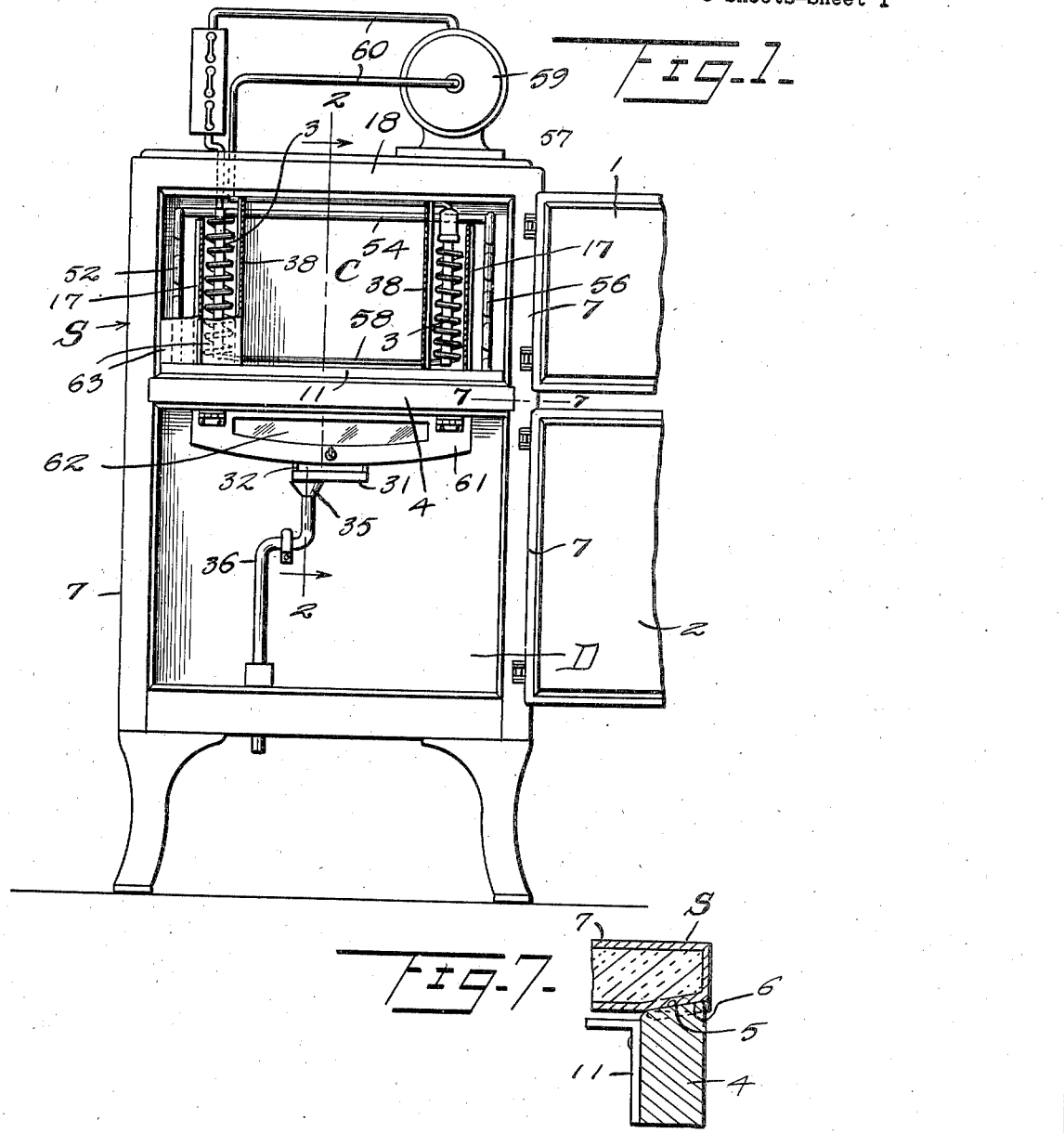

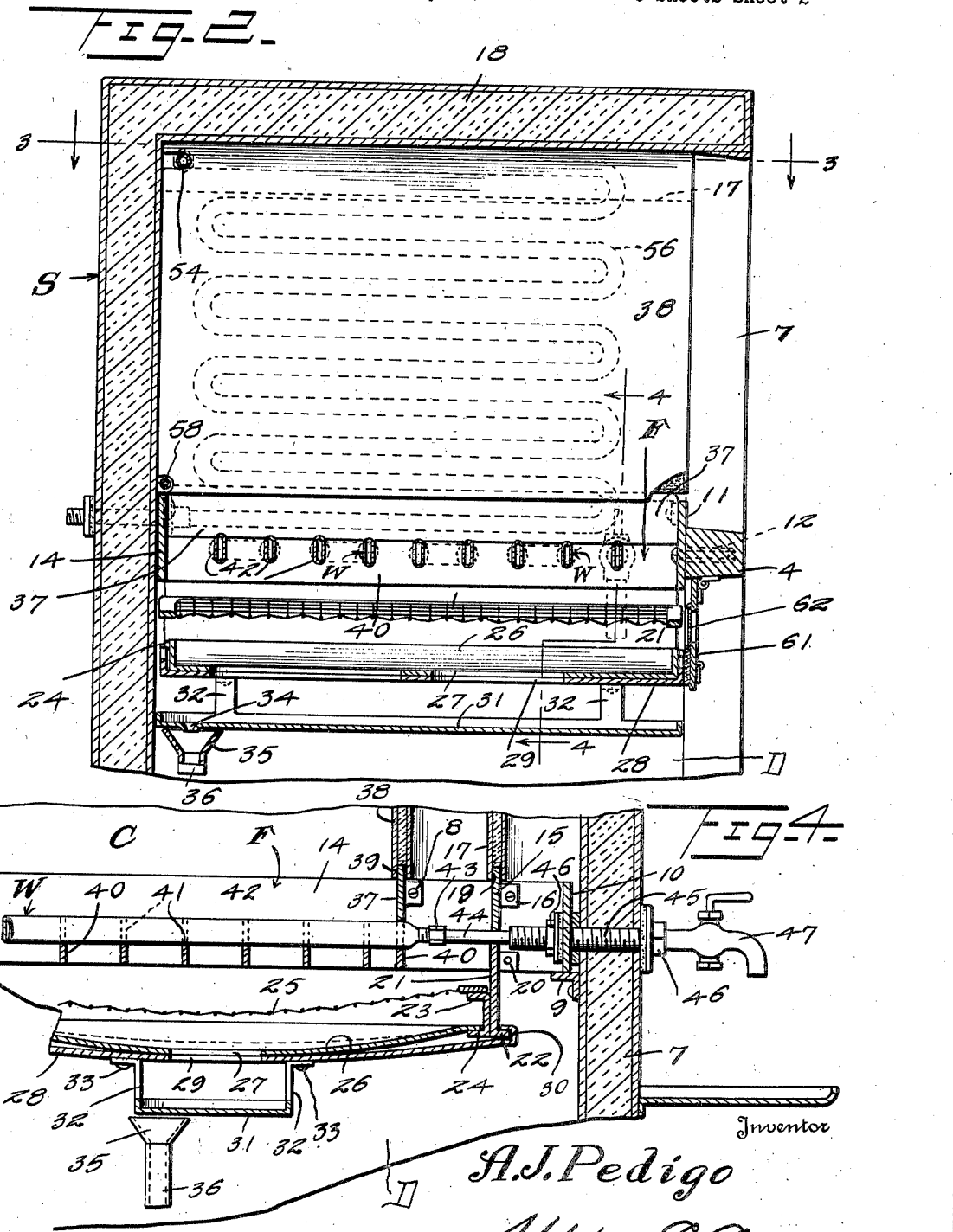

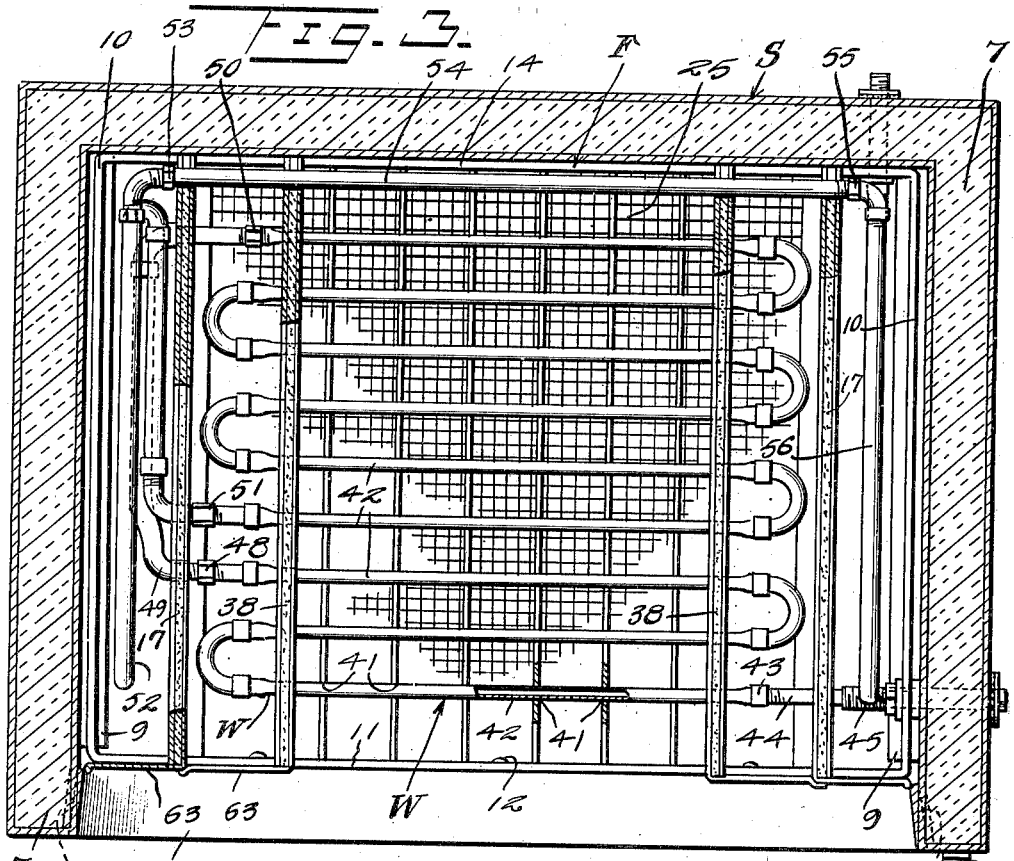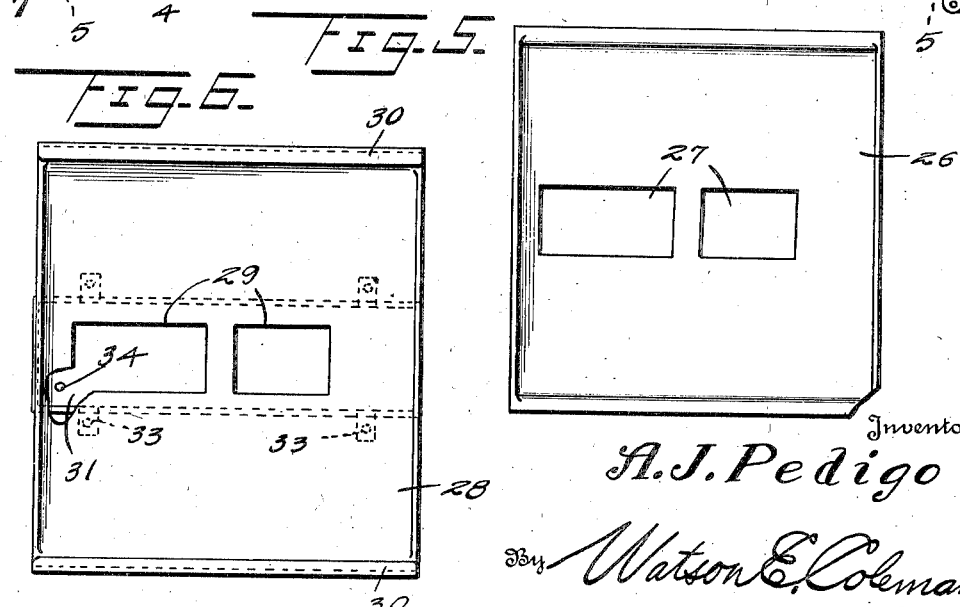

2,238,284

UNITED STATES PATENT OFFICE 2,238,284

REFRIGERATING APPARATUS

Arthur J. Pedigo, Cookeville, Tenn.

Application May 21, 1938, Serial No. 209,333

10 Claims. (Cl. 62—89)

This invention relates to a refrigerating apparatus, and it is an object of the invention to provide an apparatus of this kind which employs both melting ice and a mechanical refrigerating unit and wherein the mechanical unit carries the greater portion of the refrigerating load so that the icing periods are of considerable duration and generally of a period between a week and ten days or even longer.

A further object of the invention is to provide an apparatus of this kind including the use of melting ice together with mechanical refrigeration, the arrangement and assembly of the various parts being such that the melting ice provides an effective stabilizing medium for both temperature and humidity and, furthermore, serves to supply any deficiency of refrigeration when the demands for refrigeration may be heavy.

An additional object of the invention is to provide an apparatus of this kind wherein the melting ice is supported in a manner to provide an effective washing of the air circulating within the food chamber thus freeing the food chamber from such odors, bacteria or the like which may emanate from the foods within the food chamber.

The invention also has for an object to provide an apparatus of this kind comprising a shell or casing of any preferred construction in which the various elements comprised in the refrigerating assembly can be readily and conveniently applied or removed when desired.

The invention has for a further object the provision of means whereby water may be cooled for drinking purposes and in a manner whereby such water at no time becomes contaminated.

The invention consists in the details of construction and in the combination and arrangement of the several parts of my improved refrigerating apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in elevation and partly in section and of a diagrammatic character illustrating a refrigerating apparatus constructed in accordance with an embodiment of my invention;

Figure 2 is a fragmentary vertical sectional view taken through the refrigerating apparatus as herein disclosed;

Figure 3 is a horizontal sectional view taken through the apparatus as illustrated in Figure 1, the line of section being substantially on the line 3—3 of Figure 2;

Figure 4 is an enlarged fragmentary vertical sectional view taken through the apparatus as herein disclosed and illustrating in detail certain features of construction as herein employed;

Figure 5 is a view in top plan of one of the drip pans as herein employed;

Figure 6 is a view in top plan of a second or under drip pan with a portion broken away;

Figure 7 is an enlarged fragmentary sectional view taken substantially on the line 7—7 of Figure 1.

In the accompanying drawings, I illustrate a refrigerating apparatus particularly designed for domestic use but it is to be understood that I do not wish to limit myself in this respect as the apparatus may be constructed for other uses as desired, as for example a walk-in ice box as used in stores or the like.

As disclosed in the accompanying drawings, S denotes a shell or casing of desired dimensions and constructed in a conventional manner to provide the required insulation. As herein disclosed this shell or casing has one face open and with which open face coacts the swinging doors 1 and 2, the upper door 1 permitting access to the chamber for the melting ice and to the absorption coils 3 of the mechanical unit while the lower door 2 permits access to the food chamber.

Bridging the open face of the shell or casing S and disposed transversely thereof is a cross member or sill 4. Each end face 5 of this sill or member 4 is disposed on a suitable bevel so as to have effective wedging action against a complementary beveled portion 6 provided in the adjacent side wall 7 of the casing.

The side walls 7 of the shell or casing S are provided thereacross with the inwardly disposed ledges 9 upon which engage from above the side members 10 of a frame F. This frame F fits substantially snug within the shell or casing S. The front member 11 of the frame F is securely anchored against the inner face of the cross member or sill 4 by the bolts 12 or otherwise as may be preferred.

Interposed between the front member 11 and the rear member 14 of the frame F at each side thereof and in relatively close proximity to a side member 10 of the frame F is a flat member or strip 15 having its side faces vertically disposed. Each extremity of the strip 15 is suitably anchored, as at 16, to the adjacent front or rear member of the frame. This plate or strip 15, as is clearly illustrated in Figure 4, has its upper marginal portion extending a distance above the frame F to provide a trackway for a panel 17. This panel 17 is preferably of an insulated type and when fully applied extends from the front member 11 of the frame F to the back wall 18 of the shell or casing S. The lower marginal portion of this panel 17 is constructed to provide a groove 19 to receive the upper extended portion of the plate or strip 15 whereby the panel 17 may be readily applied in desired position. This panel 17, as is particularly illustrated in Figure 1, terminates a distance below the top wall of the shell or casing S so that the applied panel 17 serves as a baffle as will hereinafter be more fully set forth.

Also interposed between the front member 11 and the rear member 14 of the frame F and suitably secured thereto, as at 20, is a second elongated strip or plate 21. This strip or plate 21 is directly below the strip or plate 17 and coplanar therewith. This plate or strip 21 extends a material distance below the frame F and its lower marginal portion is defined by an outstanding flange 22. The lower portion of this strip or plate 21 is provided along its inner face with the vertically spaced ledges 23 and 24. The ledge 23 provides a support for a side portion of a perforated plate 25 herein disclosed as of a mesh fabric of desired gauge. As is illustrated in Figure 4, this plate 25 is preferably disposed transversely on a downward curvature. It is believed to be obvious that this plate 25 is supported at its opposite side in the same fashion as illustrated in Figure 4. It is also believed to be obvious that this plate 25 can be readily slid along the ledge 23 into working position or readily removed.

The lower ledge 24 provides a support for a drip pan 26 also preferably disposed transversely on a downward incline and provided at its low point with the relatively large discharge openings 27. This pan can be readily applied and removed so that it can be conveniently maintained in a sanitary condition.

Underlying the applied drip pan 26 is a supplemental drip pan 28 also disposed transversely on a downward curvature and provided in its central portion with the openings 29 which register with the openings 27 of the pan 26.

The side margins of the pan 28 are formed to provide the reverted flanges 30 each of which engages over the flange 22 hereinbefore referred to whereby the pan 28 may be readily slid into place or removed when desired. The purpose of this supplemental pan 28 is to catch the drippings from the melting ice during the period the upper drip pan 26 is removed for cleansing or otherwise.

It is of particular importance and advantage to employ the two pans 26 and 28 and to have the curvatures thereof, as illustrated in Figure 4, on different radii as by such assembly sweating will only occur on the under surface of the upper pan 26 and, of course, the drippings from such sweating will be received upon the lower pan 28.

Underlying the openings 29 of the pan 28 is a carry-off trough 31. This trough 31 is provided at desired space points along the opposite sides thereof with the upstanding arms 32 securely anchored, as at 33, to the under surface of the pan 28 at opposite sides of the openings 29 thereof. The inner end of this trough 31 is provided with a discharge opening 34 which delivers within the upper funnel end 35 of a drain pipe 36.

It is believed to be obvious that if desired a removable pan may be placed within the trough 31 having an opening registering with the discharge opening 34, such pan being used, of course, for sanitary purposes as such pan can be removed from time to time for cleansing purposes.

Inwardly of each of the strips or plates 15 is a similar strip or plate 37 bridging the space between the front member 11 and rear member 14 of the frame F with each end portion anchored, as at 8, to the member 11 or 14. This member or strip 37 has its upper marginal portion extending above the frame F to provide a trackway for an inner panel 38. This panel 38 is preferably of an insulated type and has its lower margin curved, as at 39, for effective coaction with the upper track portion of the member or strip 37. This panel 38 extends up to the top wall 18 of the shell or casing S and extends to the back wall thereof whereby said panel 38 constitutes a side wall of the chamber C for the melting ice which is to be applied within said chamber in the form of a block.

Interposed between the lower portions of the front member 11 and rear member 14 of the frame F are the strips or flat members 40 which extend a partial distance upwardly from the bottom of the frame F and one of these strips 40 is directly below each of the members or plates 37. These strips 40 may be welded or otherwise rigidly secured to the members 11 and 14 of the frame F, and the upper marginal portions of these strips or members 40 are provided with the spaced recesses 41 in which are received the parallel straight portions 42 of the water coils W. These coils W are preferably of copper. The straight portions 42 of the coils are flattened, as is clearly indicated in Figure 2 of the drawings, and the upper margins of these portions 42 are substantially flush with the upper edges of the strips or members 40. It is to be noted that the flattened faces of the parallel straight portions 42 of the coils W are vertically disposed. This is of particular advantage because as the ice melts down, practically all of the portions 42 are against or in contact with the ice.

The members or strips 40 together with the portions 42 of the coils W provide a supporting grid structure for the ice block when placed within the ice chamber C. In course of time the lower portion of the ice will melt in a manner to permit the ice block to extend down through such grid resulting in the formation of lower ice columns which in time will have contact with the perforated plate 25 hereinbefore referred to and after which time the ice block will to a considerable extent be supported upon this plate 25 thus relieving the grid structure.

The coils W are each of a size as determined by the requirements of practice and the terminal of one of the coils W is coupled, as at 43, to a pipe section 44 which extends between the opposed marginal portions of the strips 15 and 21 and is slidably or telescopically engaged within a second pipe section 45 which is readily insertible through an adjacent side wall 7 of the shell or casing S. This pipe section 45 is also directed through a side member 10 of the frame F and is held in applied position by the holding nuts 46. The outer end portion of the pipe section 45 has coupled thereto in any manner preferred a desired faucet 47 which is adapted to discharge within a drinking glass or other container when desired. The opposite extremity of this same coil extends within the space between the panels 17 and 38 and is detachably coupled, as at 48, with an extremity of a pipe 49 within the lower portion of the space between the adjacent panel 17 and wall 7 of the casing or shell. This pipe 49 extends rearwardly and is detachably connected, as at 50, with the innermost extremity of the second or rear water coil W. The opposite or forward extremity of this rear or second coil W is detachably connected, as at 51, with the lower end portion of a vertically disposed water coil 52. The upper extremity of this water coil 52 is detachably connected, as at 53, with a pipe line 54 extending across the shell or casing S in close proximity to the rear wall of said shell or casing. This line in turn extends through the panels 17 and 38 at the opposite side of the shell or casing and is detachably connected, as at 55, with the upper end portion of a vertically disposed water coil 56 positioned within the space between the panel 17 and adjacent side wall 7 of the casing or shell. The lower end portion of this coil 56 extends through the rear wall of the casing or shell and is adapted to be suitably connected with a desired source of water supply under pressure.

It will be noted that the water circulates through the coils W in a manner whereby it is most effectively cooled by the ice resting upon the grid and the columns extending through the grid so that when the water is discharged through the faucet 47 it is of a temperature sufficiently cool to afford a refreshing drink.

Within the space afforded between each pair of applied panels 17 and 38 is a conventional absorbing element 3 and which elements are in proper communication one with the other through the pipe line 58 and also in communication with the compressor 59 of the mechanical refrigerating unit through the pipe lines 60. The character of the mechanical unit in its details forms no particular part of the present invention and for which reason it is only illustrated in a general way.

I find it of advantage to hingedly connect with the cross member or sill 4 a depending door 61 which normally closes the spaces between the grid, the plate 25 and the pans 26 and 28. This door 61, as illustrated in Figure 1, is provided with a glass panel 62 to permit visual access to be had to the parts concealed by this door particularly to determine whether or not any of the parts should be removed for cleansing.

The heat from the foodstuffs placed within the chamber D will result in an effective circulation of the air within said chamber. The air in circulation will pass up between the panels 17 and walls 7 over the top of the panels 17 and down between the panels 17 and 38 and then circulate between the portions of the ice columns depending from the grid and down through the registering openings 27 and 29 of the pans 26 and 28 respectively and back within the chamber D. In its circulation the air, of course, passes down through the plate 25. As is particularly illustrated in Figure 4, the plate 25 is spaced a material distance above the pan 26 such space being sufficient to allow the air to also circulate below the depending ice columns to further assure the proper treatment of the air.

It is believed to be apparent that as the air contacts with the ice the foreign matter within the air, such as grease, bacteria and gases, will congeal upon the depending ice columns so that when the air returns to the food chamber D it will be thoroughly washed or freed of impurities. The ice will also melt to a sufficient extent to allow the air as it returns to the chamber to carry off a certain amount of moisture so that such air as it enters in the chamber D will contain sufficient humidity to assure the maintenance of the food in the chamber in the most desirable condition.

The ice block within the ice chamber, as has been found in practice, will last for a considerable period of time, as for example a week or ten days although it will be possible for it to last for a longer period of time. The major load of refrigeration is, of course, carried by the mechanical unit but the regulation of the temperature and humidity within the food chamber will depend upon the control of the mechanical unit. The colder the mechanical unit the slower melting of the ice with, of course, a corresponding reduction in humidity. Of course, upon the raising of the mechanical unit the greater the melting action with increased humidity.

As is particularly illustrated in Figures 1 and 3, the outer vertical edges of the panels 17 and 38 are provided with the properly directed lateral flanges 63 which serve to substantially close the space between the applied panels 17 and 38 and the applied panel 17 and adjacent wall 7 of the shell or casing S. While this at all times may not be necessary, yet the provision of these closing flanges 63 has been found to materially facilitate the required air circulation.

From the foregoing description it is thought to be obvious that a refrigerating apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A refrigerating apparatus comprising, in combination, a case, a horizontally disposed grid supported within the upper portion of the case, said grid constituting a bottom for an ice chamber, panels interposed between the grid and the top of the case, said panels constituting the side walls for the ice chamber, additional panels extending upwardly from the grid and positioned between the first named panels and the side walls of the case, said second named panels terminating below the top of the case, a mechanical refrigerating unit including absorption elements within the space between the panels at each side of the ice chamber, a perforated plate supported within the case below the grid, the grid providing means to form the lower portion of an ice block within the ice chamber into depending columns, said columns contacting with the perforated plate as they pass down through the grid, and a draining means within the case underlying the perforated plate.

2. A refrigerating apparatus comprising, in combination, a case, a horizontally disposed grid supported within the upper portion of the case, said grid constituting a bottom for an ice chamber, panels interposed between the grid and the top of the case, said panels constituting the side walls for the ice chamber, additional panels extending upwardly from the grid and positioned between the first named panels and the side walls of the case, said second named panels terminating below the top of the case, a mechanical refrigerating unit including absorption elements within the space between the panels at each side of the ice chamber, a perforated plate supported within the case below the grid, the grid providing means to form the lower portion of an ice block within the ice chamber into depending columns, said columns contacting with the perforated plate as they pass down through the grid, and a draining means within the case underlying the perforated plate, said perforated plate and draining medium being operatively supported by the grid.

3. A refrigerating apparatus comprising, in combination, a case, a horizontally disposed grid supported within the upper portion of the case, said grid constituting a bottom for an ice chamber, panels interposed between the grid and the top of the case, said panels constituting the side walls for the ice chamber, additional panels extending upwardly from the grid and positioned between the first named panels and the side walls of the case, said second named panels terminating below the top of the case, a mechanical refrigerating unit including absorption elements within the space between the panels at each side of the ice chamber, a perforated plate supported within the case below the grid, the grid providing means to form the lower portion of an ice block within the ice chamber into depending columns, said columns contacting with the perforated plate as they pass down through the grid, and a draining means within the case underlying the perforated plate, said grid being slideable into or out of the case.

4. A refrigerating apparatus comprising, in combination, a case, a horizontally disposed grid supported within the upper portion of the case, said grid constituting a bottom for an ice chamber, panels interposed between the grid and the top of the case, said panels constituting the side walls for the ice chamber, additional panels extending upwardly from the grid and positioned between the first named panels and the side walls of the case, said second named panels terminating below the top of the case, a mechanical refrigerating unit including absorption elements within the space between the panels at each side of the ice chamber, a water coil in the space between a panel and side wall of the case at each side of the ice chamber, means for communicating the coil at one side of the chamber with the coil at the opposite side, one of said coils being adapted for communication with a source of water supply, a faucet positioned exteriorly of the case, the second coil discharging through said faucet, said communicating means including certain of the cross members of the grid.

5. A refrigerating apparatus comprising a case, a horizontally disposed grid within the case constituting a bottom for an ice chamber, a mechanical refrigerating unit including absorption elements within the case above the grid, means within the case below the grid for draining off the water resulting from the melting ice and the foreign matter taken by the ice from the air as it contacts with the ice, certain of the members of the grid being formed to provide a forward horizontally disposed water coil and other of said members being formed to provide a rear horizontally disposed water coil, a pipe line connecting the rear extremities of both of such coils, a discharge faucet carried by the case, means for operatively connecting the forward end portion of the front coil to said faucet, vertical coils positioned within the case at opposite sides of the ice chamber and above the grid, means for operatively connecting said coils, one of said vertical coils being adapted for communication with a source of water supply, and means for operatively connecting the second coil to the forward end of the rear coil of the grid.

6. A refrigerating apparatus comprising, in combination, a case, a horizontally disposed grid supported within the upper portion of the case, said grid constituting a bottom for an ice chamber, panels interposed between the grid and the top of the case, said panels constituting the side walls for the ice chamber, additional panels extending upwardly from the grid and positioned between the first named panels and the side walls of the case, said second named panels terminating below the top of the case, a mechanical refrigerating unit including absorption elements within the space between the panels at each side of the ice chamber, a perforated plate supported within the case below the grid, the grid providing means to form the lower portion of an ice block within the ice chamber into depending columns, said columns contacting with the perforated plate as they pass down through the grid.

7. A refrigerating apparatus comprising, in combination, a case, a horizontally disposed grid supported within the upper portion of the case, said grid constituting a bottom for an ice chamber, panels interposed between the grid and the top of the case, said panels constituting the side walls for the ice chamber, additional panels extending upwardly from the grid and positioned between the first named panels and the side walls of the case, said second named panels terminating below the top of the case, a mechanical refrigerating unit including absorption elements within the space between the panels at each side of the ice chamber, and a plate supported within the case below the grid, the grid providing means to form the lower portion of an ice block within the ice chamber into depending columns, such columns contacting with the perforated plate as they pass down through the grid.

8. A refrigerating apparatus comprising, in combination, a case, a horizontally disposed grid supported within the upper portion of the case, said grid constituting a bottom for an ice chamber, a plate supported within the case below the grid, the grid providing means to form the lower portion of an ice block within the ice chamber into depending columns, and a mechanical refrigerating unit including absorption elements within the case at each side of the ice chamber.

9. A refrigerating apparatus comprising, in combination, a case, a horizontally disposed grid supported within the upper portion of the case, said grid constituting a bottom for an ice chamber, a plate supported within the case below the grid, the grid providing means to form the lower portion of an ice block within the ice chamber into depending columns, a mechanical refrigerating unit including absorption elements within the case at each side of the ice chamber, a water coil at each side of the ice chamber, means for communicating the coil at one side of the chamber with the coil at the opposite side, one of said coils being adapted for communication with a source of water supply, said second coil discharging exteriorly of the case, said communication including certain of the cross members of the grid.

10. A refrigerating apparatus comprising a case, a horizontally disposed grid supported within the case, said grid constituting a bottom wall for an ice chamber, said grid being tubular for the flow of water therethrough and including cross members upon which an ice block is placed, each of said cross members of the grid being flattened with their flattened faces vertically disposed to allow substantially all of said cross members to be against the ice as the ice upon the grid melts down.

ARTHUR J. PEDIGO.